Nov. 24, 1936.　　　G. W. TEMPLE　　　2,061,744
MACHINE FOR TESTING COLLAPSIBLE TUBES
Filed Aug. 15, 1934　　6 Sheets-Sheet 1

INVENTOR
George W. Temple
BY
Harry Jacobs
ATTORNEY

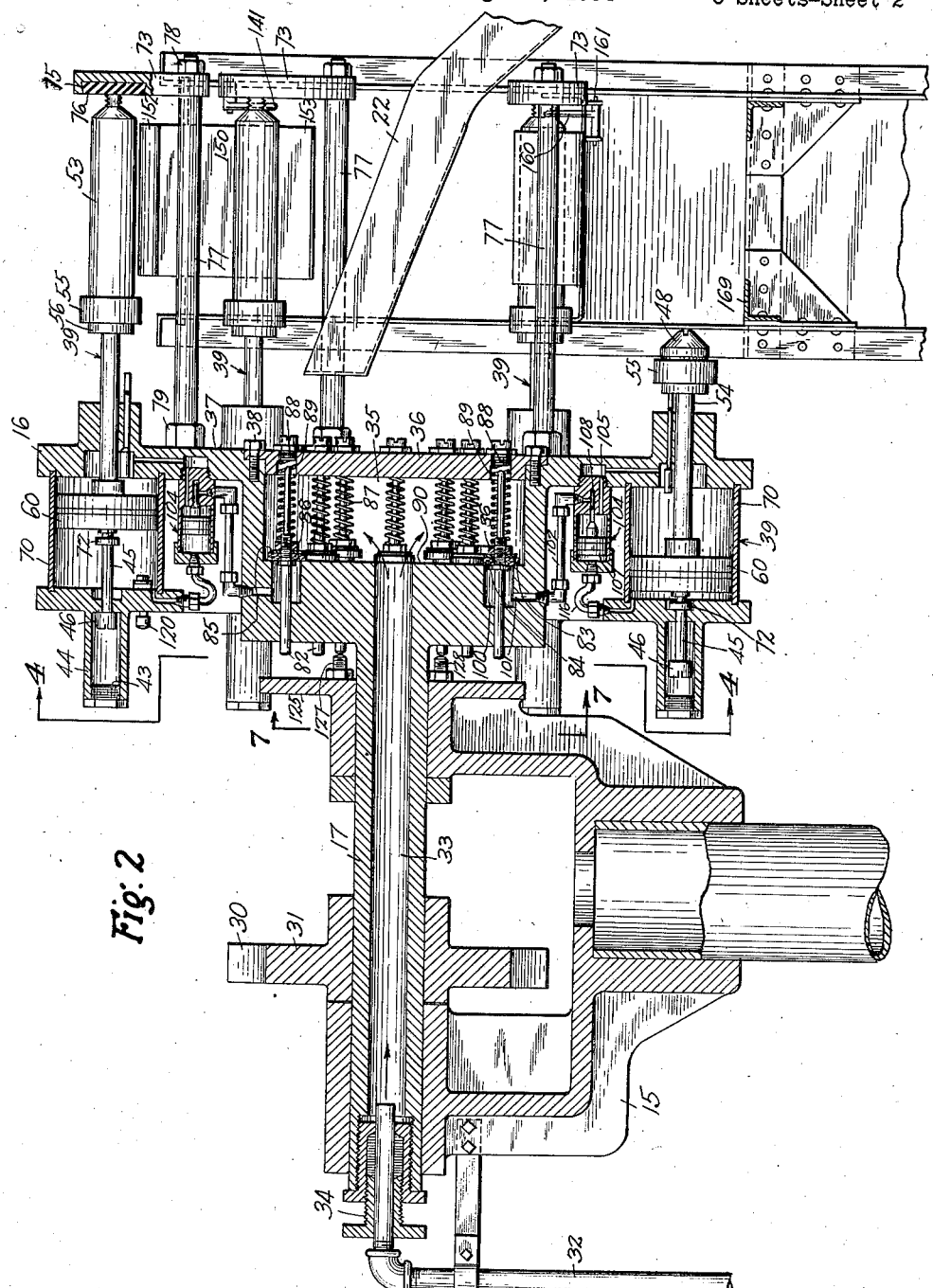

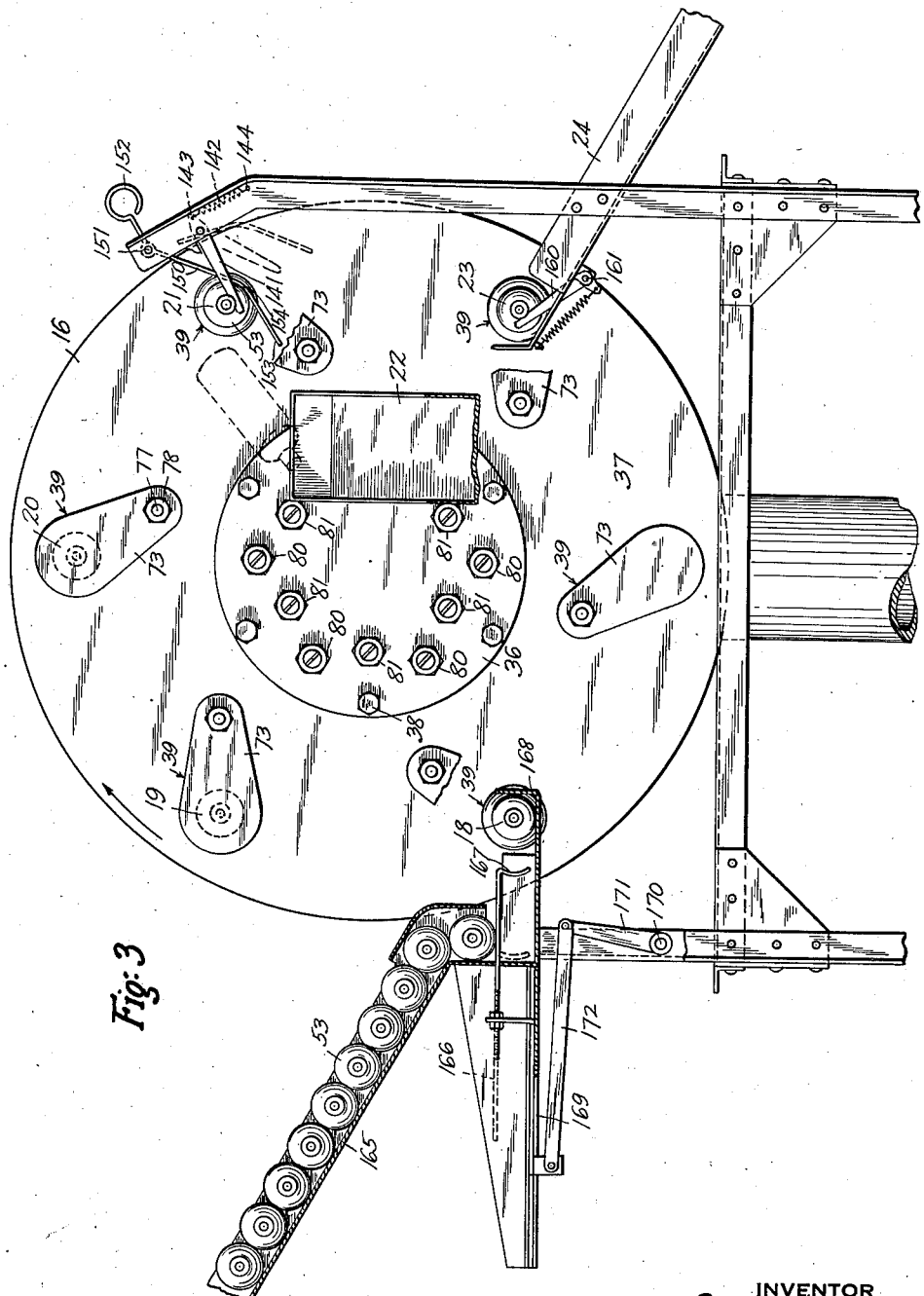

Nov. 24, 1936. G. W. TEMPLE 2,061,744
MACHINE FOR TESTING COLLAPSIBLE TUBES
Filed Aug. 15, 1934 6 Sheets-Sheet 4
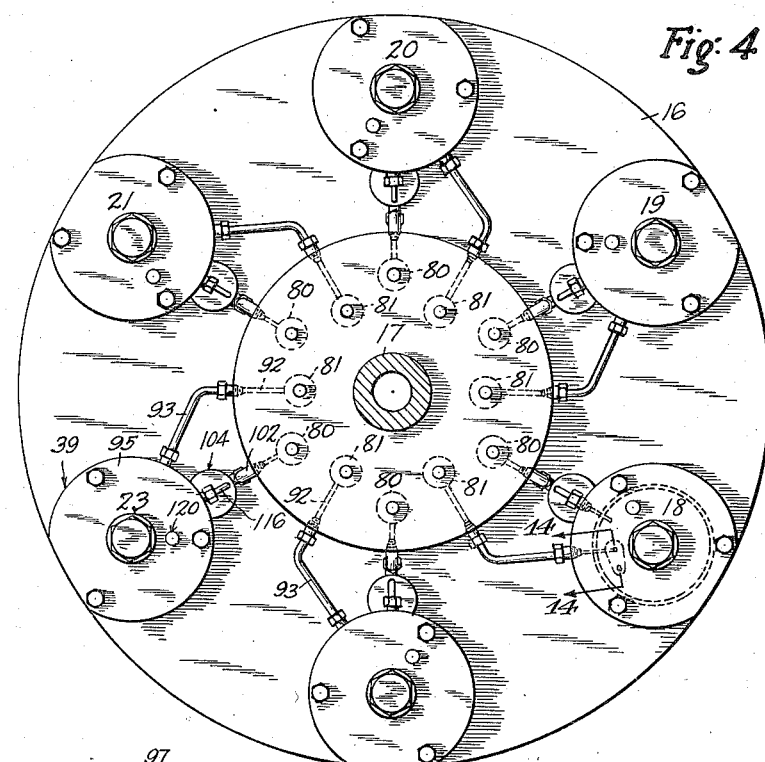
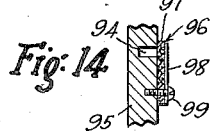
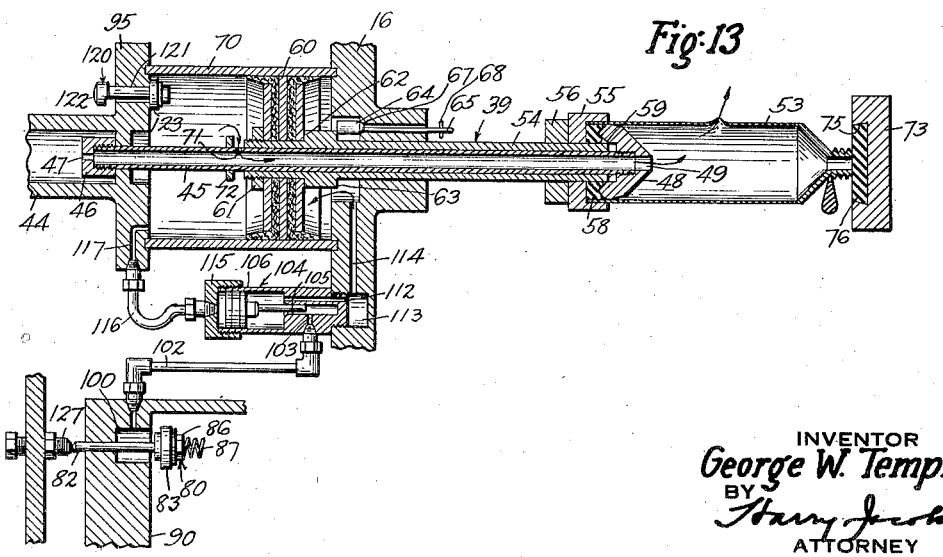
INVENTOR
George W. Temple
BY
ATTORNEY Nov. 24, 1936.                G. W. TEMPLE                2,061,744
                  MACHINE FOR TESTING COLLAPSIBLE TUBES
                    Filed Aug. 15, 1934        6 Sheets-Sheet 5
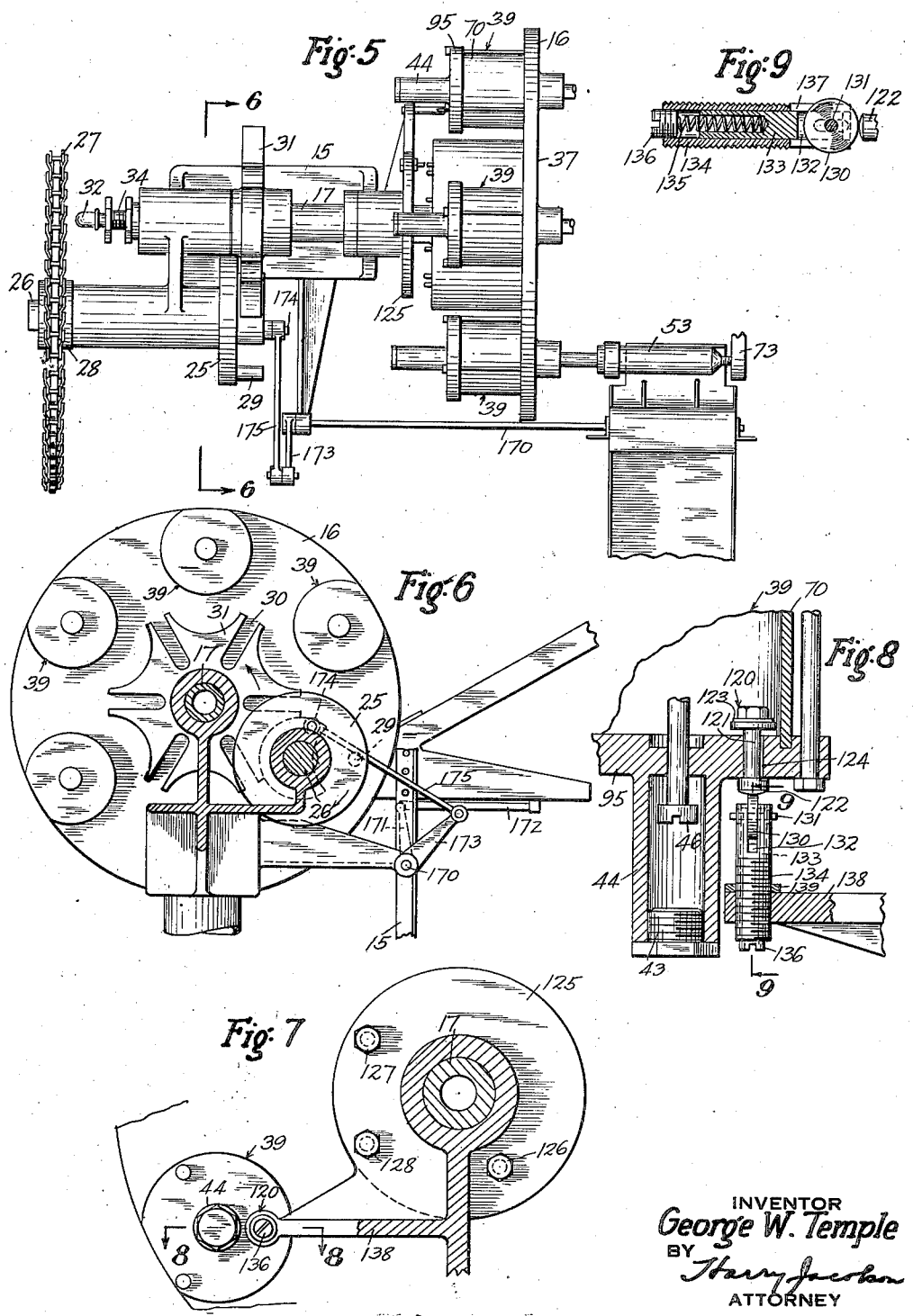
INVENTOR
George W. Temple
BY
Harry Jackson
ATTORNEY

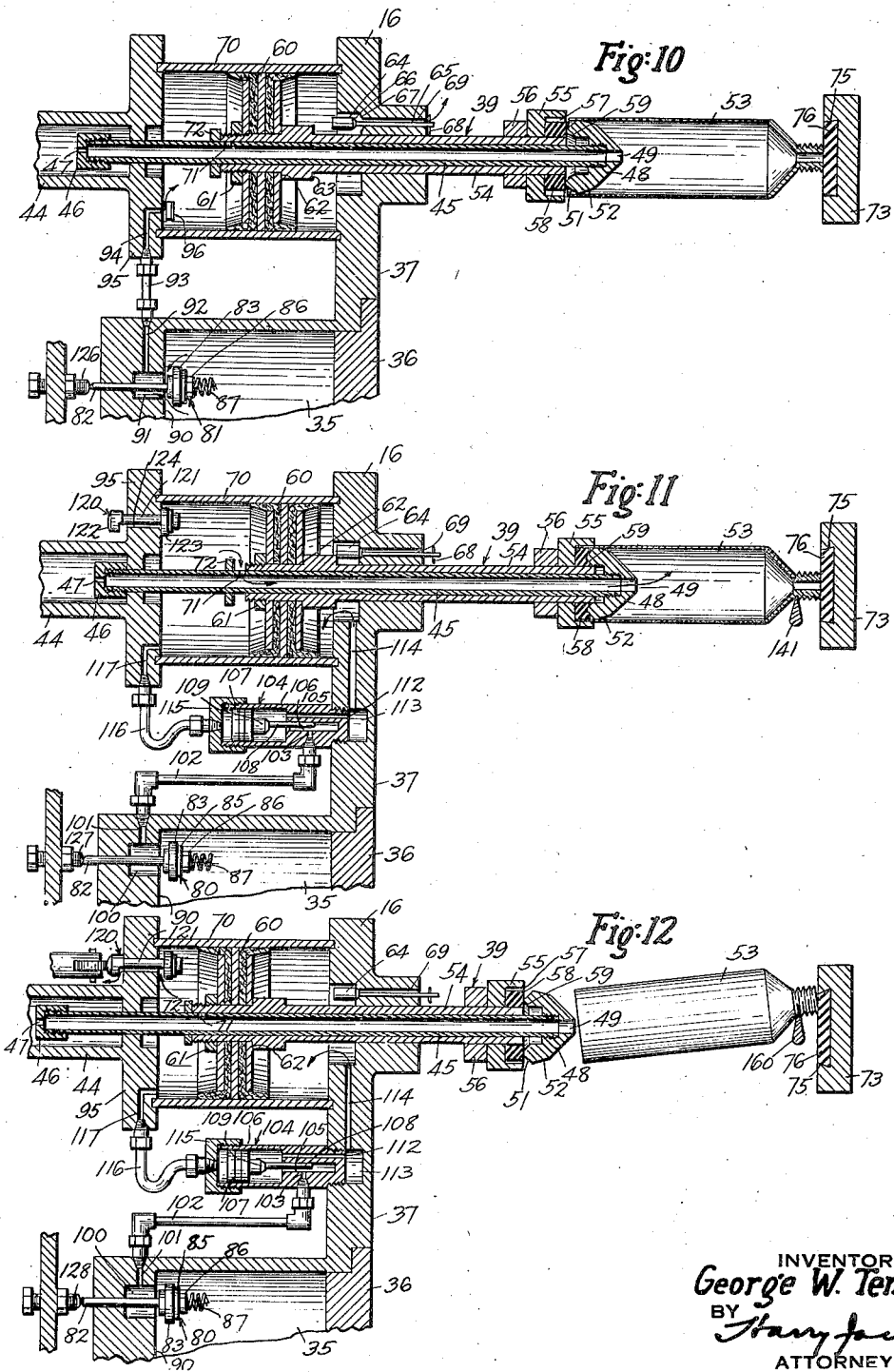

Patented Nov. 24, 1936

2,061,744

UNITED STATES PATENT OFFICE

2,061,744

MACHINE FOR TESTING COLLAPSIBLE TUBES

George W. Temple, Flushing, N. Y., assignor to Victor Metal Products Corporation, Brooklyn, N. Y., a corporation of New York Application August 15, 1934, Serial No. 739,859

20 Claims. (Cl. 73—51)

This invention relates to machines for testing collapsible tubes for leakage.

During the process of the manufacture of thin, soft metal collapsible tubes used to hold pasty materials such as tooth paste, shaving cream and the like, defective tubes are sometimes produced. The tubes sometimes contain small holes not visible to the naked eye, but sufficiently large to permit leakage of the contents, especially when the tube is subjected to pressure as when it is in use.

Visual inspection of such tubes does not reveal the defects, and it is therefore difficult to determine which tubes are sound and which are defective.

My invention therefore, contemplates the provision of means for automatically testing the tubes and for separating the defective tubes from the sound tubes.

My invention further contemplates the provision of means for subjecting the tubes to fluid pressure and of means responsive to a leakage of the fluid pressure in the tube for discarding the leaky tube.

My invention further contemplates the provision of a machine in which the tubes are automatically mounted and advanced, and by means of which the leaky tubes are discarded during the advancing operation at an intermediate stage of their advance, while the sound tubes continue through the machine and are automatically discharged into a suitable chute or receptacle therefor.

My invention further contemplates the provision of means for automatically sorting leaky tubes from sound tubes without the need of any attention on the part of the operator and without danger of the frail tubes being injured or damaged in any manner.

The various objects of my invention will be clear from the description which follows and from the drawings, in which, Fig. 1 is a perspective view of a machine embodying my invention.

Fig. 2 is a central vertical section of the same.

Fig. 3 is a front view of the same partly in section.

Fig. 4 is a vertical section taken on the line 4—4 of Fig. 2, showing the tube-carrying turret, the tube holding means carried thereby, and showing the fluid conducting connections thereto.

Fig. 5 is a top plan view of the machine.

Fig. 6 is a vertical section taken on the line 6—6 of Fig. 5.

Fig. 7 is a similar section taken on the line 7—7 of Fig. 2.

Fig. 8 is a horizontal section taken on the line 8—8 of Fig. 7.

Fig. 9 is a vertical section taken on the line 9—9 of Fig. 8.

Fig. 10 is a vertical section of the tube holding and sealing means and of the valve controlling the admission of fluid at the rear of the piston thereof.

Fig. 11 is a similar view of the same and of the valve controlling the admission of fluid at the front of the piston, in that position of the parts wherein the gripping action has been completed and the tube is firmly held in place, and pressure is being applied to the interior thereof, said valve being shown as opened preparatory to the discharge of a sound tube.

Fig. 12 is a similar view of the same in that position of the parts wherein the sound tube is being discharged from the machine, the auxiliary valve adapted to release the pressure behind the piston having been opened.

Fig. 13 is a similar view of the same at a previous station, showing that position of the parts wherein the leaky tube is about to be discharged from the machine.

Fig. 14 is a section of the flap valve taken on the line 14—14 of Fig. 4.

Figure 1:
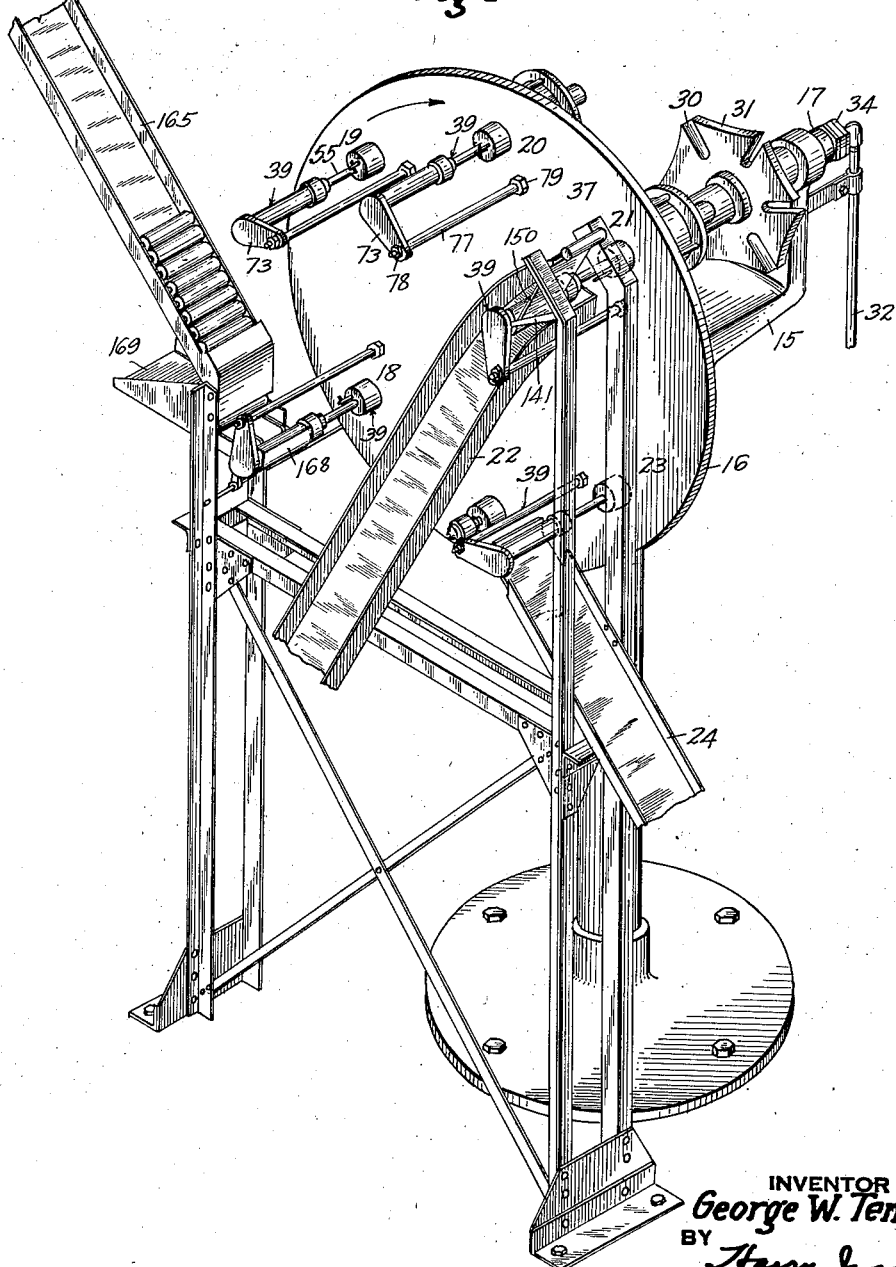

In that particular embodiment of my invention which I have illustrated by way of example, the various parts of the machine are supported by a suitable frame as 15. Mounted for rotation in suitable bearings in the frame is an intermittently revoluble turret 16, from which extends the hollow shaft 17.

The turret 16 carries the various means for sealing, supporting, and advancing the tubes from station to station, as the turret is intermittently rotated. The tubes are mounted on the tube-supporting means of the turret at the station indicated by the numeral 18 (Fig. 3). Fluid pressure, preferably air pressure, is applied to the interior of the tube at said station 18. The stations 19 and 20 are idle stations designed to provide sufficient time for the various preceding instrumentalities to become effective. Should the tube be damaged to such an extent that it leaks, the supporting means for the tube are released so that as the leaky tube reaches the station 21 the tube may be discharged into the discharge chute 22. Should, however, the tube be sound, the release means is inoperative at the stations 20 and 21 and the tube remains on the turret. At the station 23, however, the sound tube is discharged into the chute 24 for advance to other mechanisms which may operate further on the tube to complete it.

The station succeeding the station 23 and preceding the station 18 may also be an idle station if desired, it being obvious that as many idle stations as may be found desirable may be used, and depending, to a considerable extent, on the speed of operation wanted.

It will be understood that the testing machine which I am about to describe in detail, is adapted for the testing of capped and/or uncapped tubes and that, for illustration only, I have shown the machine as operating upon uncapped tubes.

For intermittently rotating the turret, disc 25 carrying the Geneva operating pin 29, is mounted on the drive shaft 26 (Figs. 5 and 6), which is continuously rotated in any suitable manner as, for example, by the chain 27 and its engaging sprocket 28. The pin 29 of the disc 25 enters a slot 30 of the slotted Geneva wheel 31 on the hollow shaft 17, on each rotation of the shaft 26, and thereby rotates the wheel 31 intermittently through a predetermined angle on each rotation of the shaft 26 in a manner which is well understood.

There being six stations and tube supports shown on the turret in the present example, it will be understood that the Geneva wheel 31 is similarly provided with six operating slots.

Means are provided for introducing fluid under pressure into the interior compartment or recess 35 of the turret 16, said fluid preferably taking the form of compressed air. Toward this end, the compressed air inlet pipe 32 (Figs. 1 and 2) communicates with the longitudinal opening 33 through the hollow shaft 17, to which it is connected as by means of a suitable stuffing box 34. The recess 35 serves as a compressed air chamber and as a valve compartment for the valves controlling the operation of the tube supporting means. Said compartment is preferably closed at its front side by the plate 36, removably secured to the front face 37 of the turret as by means of the bolts 38, the plate 36 serving also as a support for the front ends of the various valve stems, and on removal, permitting access to the valves in the recess.

Mounted on the turret at equally spaced intervals, corresponding to the various stations 18, 19, 20, 21 and 23, etc., are arranged the tube supporting and sealing units, each of which is designated generally by the numeral 39. Said units being identical in construction, a description of one will suffice for all.

The unit comprises essentially a hollow shaft 45 (Figs. 10, 11, 12 and 13) through which air may pass into the interior of the tube held by the support, and which is slidable longitudinally through the turret to carry with it the parts designed to engage and seal the open end of the tube, it being understood that collapsible tubes, when manufactured, are left open at their larger ends to permit the user to fill the tubes through said ends, and that the neck end of the tube may or may not have its cap screwed thereon when mounted on the unit. The machine is adapted to test collapsible tubes of any size by the mere substitution of certain parts, as will be clear from what follows.

At its left end, as viewed in Fig. 10, the shaft 45 carries the threaded cap nut 46 which is provided with a perforation 47 to vent the shaft 45 against back pressure. The left end of the shaft reciprocating, as it does, in an elongated hollow closed cylinder 44 (Fig. 8) closed by the plug 43, does not permit any decrease in pressure in the hollow shaft owing to passage of air in either direction through the perforation 47.

At the right end of the shaft 45 are arranged the clamping members for engaging and sealing a tube of the particular size to be tested. The right end of the shaft 45 is adjustably threaded to the conical clamp member 48, the clamp member being provided with an opening 49 communicating with the interior of the shaft 45. The greatest diameter of the member 48 is at the juncture of the oppositely tapered conical surfaces 51 and 52, which diameter is the same as the innermost diameter of the tube 53 to be tested. A long sleeve as 54 surrounds the hollow shaft 45 and is longitudinally slidable thereon and in a suitable bearing in the turret. At its right or outer end, said sleeve loosely carries the tube receiving clamp member 55 the movement of which to the left on the sleeve 54 is limited, as by means of the stop collar 56 secured to the sleeve.

It will be understood that the members 48 and 55 may be removed and similar members of a different size readily substituted should it be desired to test tubes of a different size. In the recess 57 of the clamp member 55 is arranged a washer 58 of suitable compressible and resilient material, such as rubber, said washer being normally of less diameter than that of the recess 57 and being adapted to be expanded under compression to firmly engage the inner surface of a tube inserted into said recess and around the washer. When the conical clamping member 48 is caused to enter the open end of the tube 53, said member engages the inner surface of the tube and supports the tube. It is not, however, until the tube washer 58 is urged into firm engagement with the surface 51 of the clamp member 48 and with the adjacent oppositely tapered surface 59, that the open end of the tube is sealed, it being understood that the difference in diameters between the washer 58 when expanded, and the recess 57 is substantially equal to the thickness of the wall of the tube 53.

It will be noted as seen in Fig. 11, that, during the clamping operation, the peripheral end portion of the tube wall enters the space between the washer and the adjacent wall of the recess.

When, however, the clamp member 55, together with its sleeve 54 on which it is mounted, are brought forwardly from the position of Fig. 10 to that of Fig. 11, by means later to be described, the washer 58 is forced into firm contact with the end of the clamp member 48 and is expanded thereby against the inner wall of the tube and against the rear wall of the recess, 57, thereby to completely seal the tube against possible leakage of air forced thereinto. At the same time, it will be noted that owing to the tapered shape of the clamp member 48, should the tube end be slightly bent, dented, or otherwise distorted, the end portion of the tube becomes straightened out, particularly under the expanding action of the washer 58.

The means for moving the clamp member 48 into the open end of the tube and for moving the member 55 to cooperate with the clamp member 48 to support and seal the tube, consists of the piston 60 together with certain valves and connections therefor soon to be described. The piston may comprise alternate leather and metal members as is well understood and is mounted on the sleeve 54, being fixed to said sleeve by means, for example, of the nut 61 operating on a threaded portion of the sleeve to urge the piston against an enlargement or shoulder 62 formed on the sleeve 54.

Means are provided to relieve the pressure in front of the piston 60 when it moves forwardly and thereby carries the member 55 into tube clamping position. Said means comprises a shoulder as 63 formed on the sleeve 54, said shoulder being adapted to engage the left end of the valve 64 (Figs. 10 to 12). The valve 64 is provided with a slotted stem 65 passing through the opening 69 of the turret 16 and of sufficient length to project into the path of the collar 56 of the tube-engaging unit and to be engaged by said collar on the rearward or retractile movement of the sleeve 54 and thereby to disengage the tapered portion 66 of the valve from its seat 67 formed in the wall of the turret 16 and to open the valve. Near its right end and outside of the turret, a suitable cross pin or other stop means as 68 serves to limit the rearward movement of the valve in its opening 69.

It will be understood that as the piston 60 moves forwardly in its cylinder 70, the pressure in front of the cylinder is relieved through the slot in the valve stem 65, permitting air to escape through the opening 69 so long as the valve 64 remains in the open position into which it has been previously moved by the collar 56 and thereby permitting substantially free movement of the piston. When, however, the shoulder 63 strikes said valve 64, the valve is closed, thereby projecting the valve stem 65 into position ready for reengagement by the collar 56 to reopen the valve when the tube supporting unit is retracted at either of the stations 21 or 23 for the purpose of releasing the tube for discharge from the machine.

A substantially radial perforation 71 in the shaft 45 communicating with the interior of said shaft is made at such a point in said shaft as to be exposed when the sleeve 54 and the piston carried thereby approach the right end of the cylinder 70, a stop collar as 72 being secured to the shaft 45 a sufficient distance rearwardly of said perforation to permit limited relative movement of the piston and of the sleeve 54 on said shaft 45 sufficient to open and close the perforation. It will be seen (Fig. 11) that it is only after the tube engaging member 55 has been moved forwardly into the position to firmly clamp and seal the tube 53 in place, that the perforation 71 is exposed by the hub of the piston 60 to permit air pressure within the cylinder and behind the piston to pass through the perforation 71 and through the interior of the shaft 45 into the collapsible tube 53, and thereby to put said collapsible tube under fluid pressure.

The right end of the collapsible tube 53 is suitably supported at the time that the means for clamping and sealing the open end of the tube becomes effective. For this purpose, whether the tube is provided with a sealing cap at its neck or whether said neck remains open, the arm 73 is provided. Said arm is recessed by means of a dovetail slot having tapered edges or walls 75 and into which is inserted the yieldable cushioning or sealing member 76 made of rubber or other suitable material, against which the cap of the tube, or the open neck thereof, as the case may be, is forced by the unit 39. To support the arm 73 in its proper position, it is bolted to the turret as by means of the rod 77 (Figs. 1, 2 and 3), and cooperating nuts as 78 and 79 on the rod.

The means for effecting movement of the piston and thereby clamping and sealing the tube 53, subjecting it to pressure, and releasing it at the proper time, will now be described.

Said means comprises a series of valves and means for opening and closing said valves at the proper time and under predetermined conditions, to admit compressed air on one side or on the other side of the piston 60. A pair of valves 80 and 81 are supported by the turret 16 for each of the units 39, and since there are illustrated six of such units, there are a total of twelve of such valves. The valve 80 is designed to be opened at either of the stations 21 or 23 to permit air to enter the cylinder 70 at the front of the piston 60 and thereby to move the piston rearwardly at the station 21, should the tube be leaky (Fig. 13). Should the tube be sound, however, the piston does not move at the station 21 and the tube is carried to the station 23 where the valve 80 is again opened, together with the valve 120 to move the piston rearwardly and to permit discharge of the sound tube. The valve 81, however, is opened to admit compressed air behind or at the rear of the piston to move the piston forwardly and thereby engage and seal the open end of the tube at the station 18, suitable means and connections being interposed between the compressed air compartment 35 of the turret and the piston to accomplish those purposes. All of the valves 80 and 81 being similar in construction, a description of one will suffice for all.

As best seen in Fig. 2, each of the valves consists of a rod 82 journalled in the turret 16 and passing through the rear face thereof a sufficient distance to permit reciprocation of the rod at the proper time to operate the valve. Intermediate its length, the rod 82 is threaded and carries the washer 83 of suitable flexible material, said washer being held in its place on the rod against the collar 84 as by means of the metallic washer 85 and the nut 86. The spring 87 surrounds the front end of the rod 82 and abuts at one of its ends against the nut 86 and at the other of its ends against the screw plug 88 screwed into the opening 89 in the front of the turret into which opening the spring is inserted. The rear wall 90 of the recess 35 serves as the seat for the various valves.

In connection with the valve 81 (Fig. 10), the valve recess 91 in the turret communicates with the main recess 35 and communication therebetween is closed and opened by said valve. Said recess 91 communicates through the opening 92 in the turret and through the pipe connection 93, with the opening 94 in the rear wall 95 of the cylinder 70, said opening 94 communicating with the interior of the cylinder 70, but being normally closed by means of a suitable spring-pressed flap valve 96 (Figs. 4 and 14). The flap valve comprises a member 97 of leather or other suitable flexible material backed by the spring 98, and secured at one of its ends to the wall 95 as by means of the screw 99, the member 97 being urged by the spring 98 into position normally to close the opening 94.

The valve 80 (Figs. 3, 11, 12, 13) normally closes the recess 100, urged thereto by its spring 87. Said recess communicates with the opening 101 in the turret, which opening communicates with the pipe connection 102 at one of its ends. At its other end, the pipe connection 102 communicates with the opening 103 in turn communicating with the longitudinal opening 105 in the cylinder 106 of a piston valve 104. The piston 107 is mounted for movement in the cylinder and is provided with a rod which has a reduced portion 108 fitted loosely in the opening 105 and which is also provided with an enlarged part 109 at its front end. The part 109 terminates in a conical valve surface adapted to seat on the correspondingly shaped valve seat to close the opening 105. In the front part of the cylinder 106 is provided the longitudinal opening 112 communicating with the interior of the cylinder 106 and with the recess 113 in the front wall of the turret. The opening 114 connects the recess 113 with the interior of the cylinder 70. Closing the rear end of the cylinder 106 of the auxiliary piston valve is the cap 115 carrying the pipe 116 which communicates with the inside of the cylinder 106 through the cap and with the interior of the cylinder 70 in back of the piston 60, through the opening 117.

It will be seen that when the valve 80 is opened by means soon to be described, the air or other fluid under pressure in the main turret recess 35 enters the recess 100, thence passing through the opening 101, the pipe 102, the opening 103, and the opening 105 around the valve rod therein and against the valve portion 109. When the valve 104 is open and its piston is in the position shown in Figs. 11 and 12 wherein the valve portion is removed from its seat, then the compressed air enters the interior of the cylinder 106 in front of the piston 107. From the cylinder, the air passes through the opening 112, the recess 113 and the opening 114 into the cylinder 70 in front of the piston 60. Said piston may or may not be operated rearwardly to release the tube 53 (Figs. 12 and 13) depending on other conditions soon to be explained.

The valve 81, as has been hereinbefore indicated, is opened only at the station 18. When so opened, the compressed air in the main turret recess 35 passes into the recess 91, thence through the opening 92, the pipe connection 93 and the opening 94 against the flap valve 96 to open said valve and to admit air behind the piston 60. The pressure behind the piston moves said piston forwardly into tube-engaging and clamping position (Fig. 10) as has been hereinbefore explained, the air in front of the piston 70 at this time escaping through the valve 64.

A third valve 120 (Figs. 8, 11, 12, 13) is carried by the rear wall 95 of the cylinder 70. Said valve consists of the flattened rod 121 having an enlarged head 122 at its rear end and provided with a suitable valve washer 123 arranged in the interior of the cylinder 70 and normally seated against the wall 95. The rod 121 is flattened to fit loosely in the opening 124 of the rear wall 95. In its normal position, the washer 123 closes the opening 124 since the pressure on said washer forces the valve into its rearmost position. When, however, (Fig. 12), the head 122 is acted upon by means later to be described to move the valve forwardly, the washer 123 is removed from the opening 124, opening communication from the rear of the piston 60 to the open air. Resistance to the rearward movement of the piston is thereby relieved at the proper time, that is, at the station 23, to cause the withdrawal rearwardly of the tube clamping means associated with the piston and thereby to release the tube 53 for discharge from the machine.

The means for operating the valves at the proper time will now be described. Said means comprises the plate 125 (Figs. 2, 5 and 7) on which are mounted the stationary valve-rod operating studs 126, 127 and 128. Each of said studs is provided with a preferably rounded end portion which projects forwardly far enough to engage the rearwardly projecting portion of the rod or stem 82 of a valve as the valve stems are carried around by the turret during its rotation. For example, the studs 126 are designed to engage and open the valves 81 at station 18 only. The studs 127 and 128 are arranged to engage and open the valves 80 at the stations 21 and 23, respectively.

To open the valve 120 at the station 23, a suitable roller as 130 (Figs. 7, 8, 9, and 12) is mounted as by means of the pin 131 in the slot 132 of the plunger 133. Said plunger is adjustably mounted in the sleeve 134 as by means of the spring 135 and the adjusting screw 136. At its forward end, the sleeve 134 is slotted as at 137 to permit rotation of the roller 130. Said sleeve is held in the stationary arm 138 as by means of a suitable lock nut 139. It will be understood that the roller 130 is arranged in the path of the heads 122 of the valves 120 so that as said valves are carried around the shaft 17 on the rotation of the turret, the head 122 of the valve is engaged by the roller to force said valve forwardly and thereby to open the valve at the tube discharging station, namely, the station 23.

It will be understood that there are two possible tube discharge stations, namely, 21 and 23. At the station 21, defective tubes are discharged into the chute 22 while at the station 23, the sound tubes are discharged into the chute 24.

In the vicinity of the station 21, there is pivoted to the frame 15 as at 140, the discharge lever 141. The spring 142 is connected at one end 143 (Fig. 3) to the lever 141 and at its other end 144 to the frame 15 and thereby urges the free end of the lever into contact with the neck of the tube or with the cap thereon. If the tube is defective, the clamping members 48 and 55 are withdrawn from the open end of the tube by air pressure admitted in front of the piston 60, through the valves 80 and 104, whereby the spring 142 serves to throw the neck end of the tube towards the chute 22 and to discharge the tube from the turret into said chute. To aid in the discharge, the guide lever 150 is pivoted to the frame at 151 and is weighted at its end 152. The guide lever, intermediate its ends as at 154, is shaped to be normally engaged by the surface of the tube. The tube, when unsupported on the withdrawal of the clamping means, rolls along the end portion 153 of the guide lever toward the chute 22.

If the tube, however, is sound and is not discharged at the station 21, both levers 150 and 141 are moved by the engagement of the tube surface with the part 154 and of the tube neck with the lever 141 out of the path of the tube on the rotation of the turret to the dotted line positions indicated in Fig. 3.

At the station 23, there is similarly provided a thin discharge lever 160 pivoted as at 161 and normally pulled by a suitable spring into engagement with the neck end of the tube. Since the tube clamping means are always withdrawn rearwardly from their tube supporting positions at the station 23, the discharge lever 160 becomes operative to disengage the front end of the tube from the sealing member 76 to discharge the tube into the chute 24.

The tubes are arranged automatically in their proper positions to be engaged by the tube clamping means at the station 18. Toward this end, the tubes are arranged in the inclined chute 165 (Figs. 1 and 3), rolling down said chute until they rest upon the upper surface of the slide 166. Said slide is provided at its front end with a curved depending arm 167 adapted to engage and push upon the surface of the tube to forward it into its proper position for engagement by the tube clamping means and against the stop 168 while the tube rests on the horizontal bottom 169 of the chute.

To reciprocate the slide 166 and thereby to forward a tube from the row of tubes into mounting position against the stop 168, there is provided (Figs. 3, 5 and 6) a shaft 170 journalled for rotation in the frame of the machine and provided with a crank 171 operatively connected to the slide as by means of the link 172. Said shaft 170 also carries the crank 173 which is connected to the pin 174 of the disc 25 as by means of a suitable link 175. It will be seen that on the rotation of the disc 25, which is mounted on the shaft 26, the shaft 170 is oscillated thereby reciprocating the slide at the proper time. In other words, the slide 166 is drawn toward the left as viewed in Fig. 3 to permit a tube to drop out of the inclined part of the chute on to the bottom 169 since the slide normally supports the row of tubes. The slide being in its rearmost position as shown by the dotted lines of Fig. 3, the row of tubes rests on the bottom tube which in turn rests on the bottom 169. On the movement of the slide 166 toward the right, the bottom tube is moved along the bottom 169 into contact with the stop 168, the remaining tubes of the row resting on the slide ready for a repetition of the operation. When the piston 60 is now operated by the opening of the valve 81, the tube clamping means is moved forwardly to engage and seal the open end of the tube in the manner hereinbefore described.

At the station 18, the valve 81 is opened by the stud 126, thereby permitting air to enter at the rear of the piston 60 and to move said piston forwardly to perform the clamping action hereinbefore described, the air in front of the piston at this time being forced out through the opening 69 and past the valve 64. As the turret is rotated intermittently by the Geneva movement, the operation is repeated and another tube is mounted on the next succeeding tube clamping unit.

When the tube reaches the station 21, the valve 80 is opened by the stud 127. Should there be any leakage of air from within the tube at this station, the pressure behind the piston 60 is reduced as compared to the pressure in front of the piston since the air is partly exhausted through the opening in the sleeve 45 and through the perforation 71 to the exterior air through the pin hole or other defect in the tube 53 (Fig. 13). Similarly, the rear part of the cylinder 70 being in communication with the rear part of the valve cylinder 106, the pressure behind the valve piston 107 is reduced, permitting the air to open the valve 104 and to admit air under full pressure in front of the piston 60 and thereby to cause retraction of said piston, of the sleeve 54, together with the collar 56 first to loosen the clamping member 55 and the washer 58 and then after the piston sleeve has engaged the shaft stop collar 72, to withdraw the clamping member 48 from the tube 53. The tube is thereby freed to drop into the chute 22, and is aided in doing so on the next movement of the turret, by the levers 150 and 141.

If the tube is sound, and the pressure behind the pistons 60 and 107 is maintained, the valve 104 cannot open at the station 21, since the rear surface of the piston 107 has a greater area than the front surface thereof, the front area being reduced by the rod part 108 and consequently there being less pressure on the front surface than on the rear surface even though the valve 80 is open.

At the station 23, the valve 120 is opened by the roller 130 and the valve 80 again opened by the stud 128 (Fig. 12). The air pressure behind the pistons 60 and 107 is thereby reduced, permitting the piston 107 to move rearwardly to open the valve 104, thereby admitting air in front of the piston 60 and causing retraction of the tube clamping unit and freeing the tube to be discharged into the chute 24 by gravity and the aid of the lever 160.

It will be seen that I have provided a machine in which the tubes are automatically mounted, and in which the defective tubes are automatically discharged at one station, while the sound tubes are automatically discharged at a different station, whereby the sound tubes are separated from the defective tubes without any attention on the part of the operator.

It will also be seen that I have provided a machine capable of high speed operation, entirely automatic throughout and well adapted to meet the severe requirements of practical use. While I have shown and described certain specific embodiments of my invention, I do not wish to be understood as limiting myself thereto but desire to claim my invention as broadly as may be permitted by the state of the prior art and the scope of the appended claims.

I claim:

1. In a machine for testing for leakage thin, fragile collapsible tubes each having an open end and a neck end, means for supporting and sealing the tube and for also advancing the tube, said means including movable sealing and clamping members arranged respectively to engage the inner and outer surfaces of the periphery of the open end portion of the tube and a relatively stationary member adapted to engage the neck end of the tube, means for subjecting the tube to interior fluid pressure, and means responsive to leakage from the tube for rendering the supporting and sealing means inoperative at a predetermined instant in the cycle of operation of the machine and to permit discharge of the tube from the machine.

2. In a machine for testing collapsible tubes, a turret intermittently revoluble to a plurality of stations, a series of movable tube sealing and clamping units on the turret, means for mounting a tube on each of the units at one station, means for applying fluid pressure to the interior of the tube, and fluid pressure operated and controlling means responsive to leakage of fluid from the tube for withdrawing the sealing and clamping unit from the tube only when a second station is reached, and if the tube is sound for maintaining said sealing and clamping unit operative until a third station is reached and then to withdraw said unit.

3. In a machine for testing collapsible tubes, a movable tube supporting and sealing unit having an opening therein, means for intermittently advancing said unit from station to station, means for moving a tube to be tested into position to be mounted on said unit comprising a reciprocating slide, a chute, and a stop on said chute, means for supplying fluid pressure through said opening to a tube supported by the unit, and fluid pressure operated means responsive to leakage of fluid from the tube to cause movement of the unit in a direction to release the tube at a predetermined station and being responsive to the maintenance of pressure in the tube to carry the tube past said predetermined station.

4. In a machine for testing collapsible tubes, each having a neck end and an open end, means for supporting and advancing a tube in horizontal position including a relatively stationary member for engaging the neck end of the tube, and movable members for engaging and sealing the inner and outer surfaces of the periphery of the open end portion of the tube, means for supplying fluid pressure to the interior of the tube, and means responsive to leakage of fluid from the tube to release the tube at a definite predetermined point only in the advance thereof and being responsive to the maintenance of pressure in the tube to cause the supporting means to release the tube at a different definite predetermined point in its advance.

5. In a machine for testing collapsible tubes for leakage, an intermittently revoluble turret, a plurality of retractile and expansible tube clamping and sealing units on the turret including a member adapted to be expanded against the inner surface of a tube, and means responsive to fluid pressure for extending each of said units into tube engaging position at a predetermined station, for retracting the unit at a predetermined station should the tube engaged by said unit be leaky, and for retracting the unit at another different station to release the tube, should the tube be sound.

6. In a machine for testing collapsible tubes, means responsive to fluid pressure for sealing and supporting a tube having an open end, and for subjecting the tube to fluid pressure, and means responsive to fluid pressure to withdraw the supporting means if the tube is leaky including a valve responsive to fluid pressure and communicating with and controlling the pressure on said supporting and sealing means, a second valve controlling the pressure on one side of the first-mentioned valve, and means for operating said second valve.

7. In a machine for testing collapsible tubes, means for supporting a tube and for admitting fluid under pressure to the interior of the tube, and means operatively connected to the supporting means and responsive to a decrease of pressure in the tube to withdraw said supporting means from the tube including a valve responsive to fluid pressure, and means for controlling the operation of said valve comprising means for controlling the supply of fluid to said valve and therethrough to said withdrawing means.

8. In a machine for testing and sorting collapsible tubes, means for supporting a tube having an open end and for admitting fluid under pressure to the interior of the tube, means operatively connected to the supporting means and responsive to a decrease of pressure in the tube to withdraw said supporting means from the tube, said withdrawing means maintaining the supporting means in tube-supporting position if the tube is sound, and means for actuating said withdrawing means to discharge a sound tube including a fluid pressure operated piston valve, a valve controlling the piston valve, and means for opening the control valve.

9. In a machine for testing and sorting collapsible tubes, means movable from station to station and also movable into and out of tube-supporting position for supporting a tube and for supplying fluid under pressure to the interior of the tube, a piston valve, means for operatively connecting the piston valve to the supporting means, said piston valve controlling the admission of fluid under pressure to the supporting means in the position to withdraw said supporting means from the tube to discharge a sound tube at one station, and said supporting means being responsive to leakage of fluid from the tube to move under the control of said piston valve out of tube supporting position and to discharge a leaky tube at a different station, a first valve for controlling the operation of said piston valve, a second valve for reducing the fluid pressure upon the supporting means, and means for opening said first valve at said different station and for opening both of said first and second valves at said one station.

10. In a machine for testing and sorting collapsible tubes, clamping and sealing means for a tube having an open end, comprising a first clamping member having an opening therethrough and adapted to enter the open end of the tube, a second clamping member movable relatively to the first clamping member and adapted to cooperate therewith to clamp the peripheral portion of the open end of the tube therebetween, and a piston mounted coaxially of and operatively connected to said clamping members, valve means for supplying fluid pressure to one side of the piston and to a tube supported by said clamping and sealing means, to move said clamping members into tube-clamping position, valve means for supplying fluid pressure to the other side of the piston to withdraw the clamping member from the tube at a predetermined time, and means for operating said last mentioned valve means at a different time to supply an excess of fluid pressure to said other side of the piston and to cause movement of the piston in a direction to withdraw the clamping and sealing means from the tube to permit discharge of the tube if leaky.

11. In a machine for testing and sorting collapsible tubes, means movable from station to station, for clamping the open end of a tube comprising a pair of clamping members, one being expansible and adapted to enter the tube through the open end and to engage the inner surface of the tube and the other to engage the outer peripheral surface of the end portion of the tube, means responsive to fluid pressure for expanding the expansible member, means for supplying fluid pressure to the interior of the tube, and means responsive to fluid pressure for withdrawing said clamping members from the tube to release the tube at one station if the tube is leaky, and if the tube is not leaky, for withdrawing said clamping members from the tube to release the tube at a different station.

12. In a machine for testing and sorting fragile collapsible tubes requiring internal support when subjected to endwise pressure, valve-operated means adapted to enter and engage the inner surface of the open end of a tube for clamping and sealing the tube and for subjecting the tube to fluid pressure, means for intermittently moving said clamping means from station to station and valve means responsive to fluid pressure and to leakage of fluid from the tube for controlling the actuation of said clamping means to clamp a tube at one station, to withdraw the clamping means from the tube at another station if the tube is leaky, and if not previously withdrawn, to withdraw the clamping means from the tube at still another station.

13. In a machine for testing and sorting fragile collapsible tubes requiring internal support when subjected to endwise pressure, a turret, means for intermittently rotating said turret from station to station, a series of identical tube clamping units mounted in spaced relation on the turret, means for feeding a tube from a row of such tubes into position for mounting on the units at one station, means for subjecting the interior of the tube to fluid pressure and valve operated means connected to each of the clamping units and responsive to leakage of pressure in the tube to withdraw the clamping unit from the tube and to release the tube at a first tube discharge station, said last mentioned means withdrawing the clamping means from the tube to release the tube at a succeeding station if the tube is not leaky.

14. In a machine for testing and sorting collapsible tubes, a series of tube clamping and sealing units including a member adapted to engage the outer end surface of a tube, and an expansible member adapted to engage the inner end surface of the tube when expanded, means for intermittently advancing said units from station to station, means for subjecting the interior of the tube to fluid pressure, means for projecting a unit into tube-engaging position at one station, and means responsive to fluid pressure and to leakage of fluid from the tube for actuating said projecting means to withdraw the clamping unit from the tube at another station if the tube is leaky and for withdrawing the clamping unit from the tube at a different station if the tube is not leaky.

15. In a machine for testing and sorting collapsible tubes, a tube engaging and clamping unit movable from station to station, means for advancing a tube from a row of such tubes into position for mounting on the clamping unit at one station, said unit including a piston operatively connected to the remainder of the unit for projecting said unit into tube-engaging position at said one station, and said unit being provided with means for subjecting the interior of the tube to fluid pressure, fluid pressure responsive means also responsive to leakage of fluid from the tube for controlling the actuation of the piston to withdraw the unit from the tube at another station, said piston being responsive to a decrease of pressure therebehind, resulting from a leaky tube to withdraw the clamping unit from the tube at a predetermined station different from the stations heretofore mentioned.

16. In a machine for testing and sorting collapsible tubes, a fluid-operated clamping and sealing unit comprising a cylinder, a piston reciprocatory within said cylinder, a hollow shaft concentric with the piston, a sleeve slidable on the shaft and carrying the piston, a tapered tube-clamping member at one end of the shaft and having an opening communicating with the interior of the shaft, a second clamping member on the sleeve adapted to engage the outer end portion of a tube and cooperating with the tapered clamping member to clamp the tube therebetween, and a valve to admit fluid pressure in front of the piston and thereby to cause withdrawal of said clamping members from the tube at a given station, said hollow shaft having an opening therein communicating with the interior of the cylinder behind the piston to cause a decrease in the fluid pressure behind the piston should the tube be leaky.

17. In a machine for testing and sorting collapsible tubes, a reciprocatory clamping unit intermittently revoluble from station to station including a pair of cooperating clamping members, a piston operatively connected to said members to mount a tube on said unit at one station, and a cylinder enclosing the piston and communicating with the interior of a tube mounted on the clamping members in the tube clamping position of the piston, valve means for controlling the admission of fluid under pressure behind the piston, to apply pressure to the interior of the tube and to project the piston and the clamping members into tube-engaging position, and valve means for controlling the admission of fluid under pressure in front of the piston to withdraw the clamping members from the tube on the decrease of the pressure behind the piston occurring at a predetermined station if the tube is leaky, and means for decreasing the pressure behind the piston to withdraw the clamping members from the tube at a different given station.

18. In a machine for testing and sorting collapsible tubes, means intermittently movable from station to station for supporting, clamping and sealing a tube comprising a cylinder, a piston movable within the cylinder under fluid pressure, means operatively connected to the piston for clamping the tube in place, said last mentioned means communicating with the interior of the cylinder behind the piston in the tube-engaging position of the supporting means to subject the interior of the tube to fluid pressure, valve means for admitting fluid under pressure in front of the piston at a given station to urge the piston rearwardly and thereby to withdraw the supporting means from the tube, said piston remaining stationary prior to decrease in pressure therebehind caused by leakage of the fluid from the tube and then moving rearwardly to disengage the supporting means from the tube at a predetermined station, and means for decreasing the pressure behind the piston at a different station to permit movement of the piston and thereby to cause withdrawal of the supporting means from the tube.

19. In a machine for testing and sorting collapsible tubes, a piston-operated tube-supporting unit for engaging one end of a tube, a relatively fixed member for engaging the other end of the tube, said member and said unit comprising the sole means for supporting the tube, means for intermittently advancing the unit and the member from station to station, means for mounting the tube on the unit at one station including reciprocatory means for moving the tube into position for engagement by said unit, means for withdrawing the unit from the tube at another station if the tube is leaky, a discharge chute for leaky tubes at said last mentioned station, means for withdrawing the supporting means from the unit at a different station if the tube is sound, a discharge chute for sound tubes at said different station, and spring-pulled means for engaging the tube at each of the discharge stations to aid in the discharge of the tubes from the machine and into the chutes.

20. In a machine for testing thin metal collapsible tubes for leakage, said tubes being fragile and requiring internal support, means for intermittently advancing a tube, means for sealing and supporting the ends of the tube during the advance thereof including supporting means engaging the inner surface of one end portion of the tube, means for applying fluid pressure to the interior of the tube, and valve means responsive to leakage of the tube for rendering the tube supporting means inoperative and to discharge the tube if leaky from the machine at a predetermined station and at a predetermined instant in the cycle of operation of the machine, said supporting means remaining operative to carry a tube if not leaky past said station.

GEORGE W. TEMPLE.